(No Model.)  7 Sheets—Sheet 1.

B. C. WHITE.
BRICK MACHINE.

No. 406,682. Patented July 9, 1889.

Witnesses:
Louis M. F. Whitehead.
Wm. L. Fleming.

Inventor:
B. Clark White.
by Clayton & Poole
Attorneys.

(No Model.) 7 Sheets—Sheet 2.

B. C. WHITE.
BRICK MACHINE.

No. 406,682. Patented July 9, 1889.

Witnesses:—
Louis M. F. Whitehead.
Wm. F. Henning.

Inventor:—
B. Clark White.—
by— Dayton & Poole
Attorneys.—

(No Model.) 7 Sheets—Sheet 3.
B. C. WHITE.
BRICK MACHINE.

No. 406,682. Patented July 9, 1889.

Witnesses:
Louis M. F. Whitehead.
Wm. F. Henning.

Inventor:—
B. Clark White.—
by:— Dayton & Poole
Attorneys (No Model.)

B. C. WHITE.
BRICK MACHINE.

No. 406,682.

7 Sheets—Sheet 4.

Patented July 9, 1889.

Witnesses:—
Louis M. Whitehead.
Wm. F. Henning.

Inventor:—
B Clark White.

by—Dayton & Poole
Attorneys.

(No Model.)

B. C. WHITE.
BRICK MACHINE.

No. 406,682.   Patented July 9, 1889.

Witnesses:—
Louis M. F. Whitehead.
Wm. F. Henning.

Inventor:—
B. Clark White.

by Clayton & Poole
Attorneys.

(No Model.) 7 Sheets—Sheet 6.

B. C. WHITE.
BRICK MACHINE.

No. 406,682. Patented July 9, 1889.

Witnesses:
Louis M. F. Whitehead
Wm. F. Henning

Inventor:
B. Clark White
by Dayton & Poole
Attorneys.

(No Model.) 7 Sheets—Sheet 7.
B. C. WHITE.
BRICK MACHINE.
No. 406,682. Patented July 9, 1889.
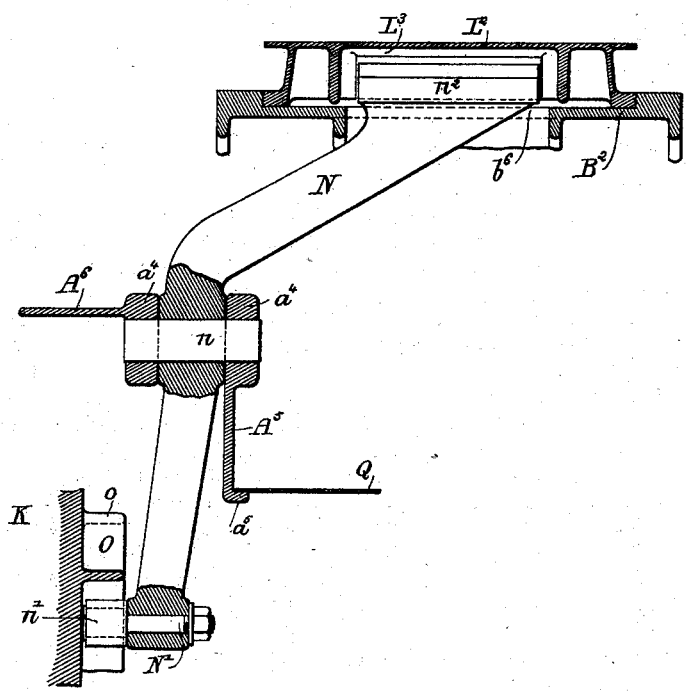
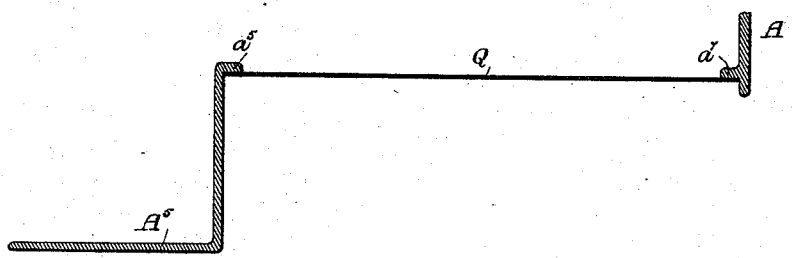

UNITED STATES PATENT OFFICE.

BRUCE CLARK WHITE, OF CHICAGO, ILLINOIS, ASSIGNOR TO CHISHOLM, BOYD & WHITE, OF SAME PLACE.

BRICK-MACHINE.

SPECIFICATION forming part of Letters Patent No. 406,682, dated July 9, 1889.

Application filed June 27, 1887. Serial No. 242,577. (No model.)

*To all whom it may concern:*

Be it known that I, BRUCE CLARK WHITE, of Chicago, in the county of Cook and State of Illinois, have invented certain new and useful Improvements in Brick-Machines; and I do hereby declare that the following is a full, clear, and exact description thereof, reference being had to the accompanying drawings, and to the letters of reference marked thereon, which form a part of this specification.

This invention embraces improvements in machines for making brick of that class in which the clay to form bricks is fed automatically to a mold or molds and is compressed therein by means of two opposing plungers, which are moved toward and from each other for compressing the brick and one of which is moved after the brick is compressed in such manner as to discharge the finished brick from the mold.

The invention consists in the matters hereinafter described, and pointed out in the appended claims.

Figure 1:
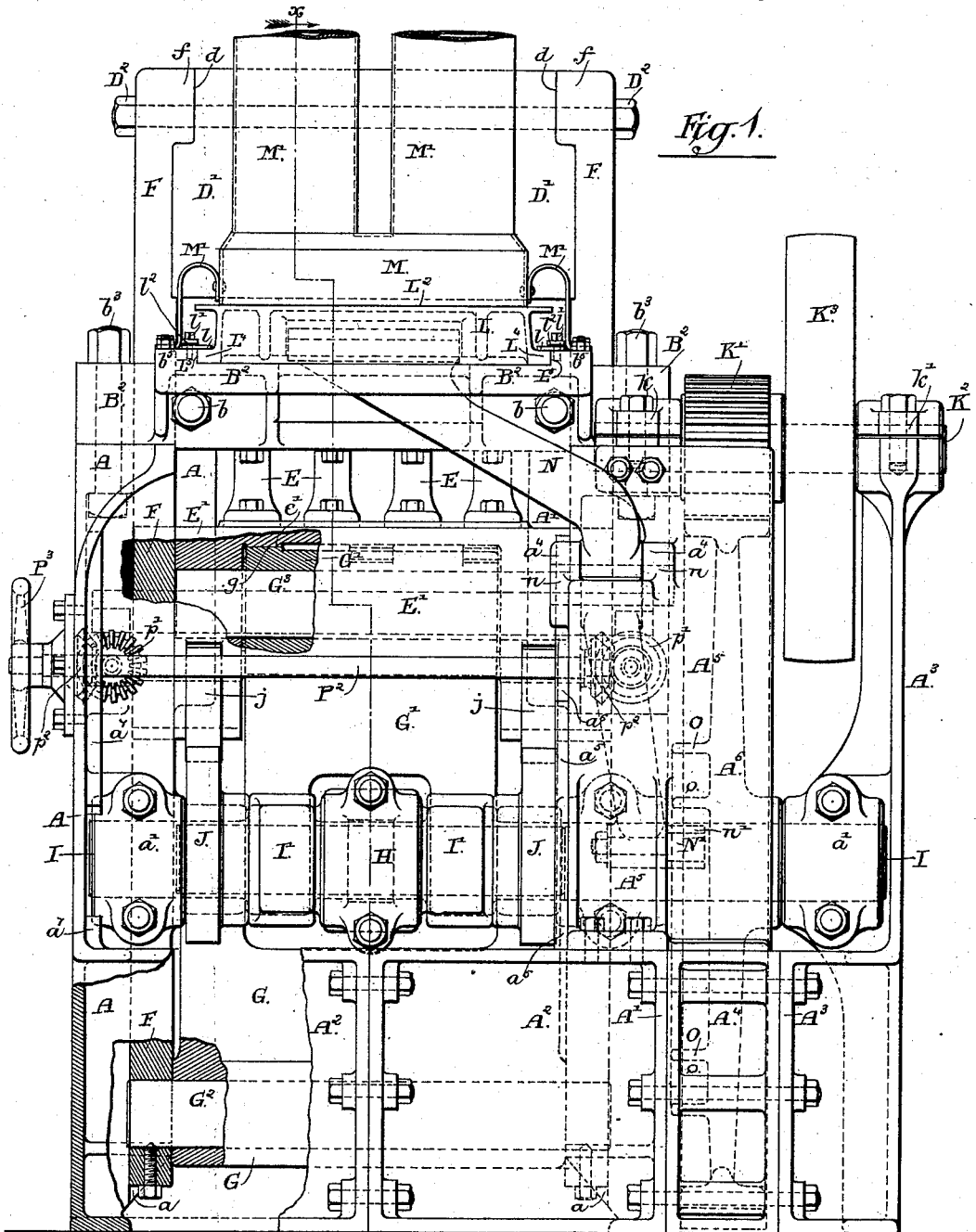
Figure 2:
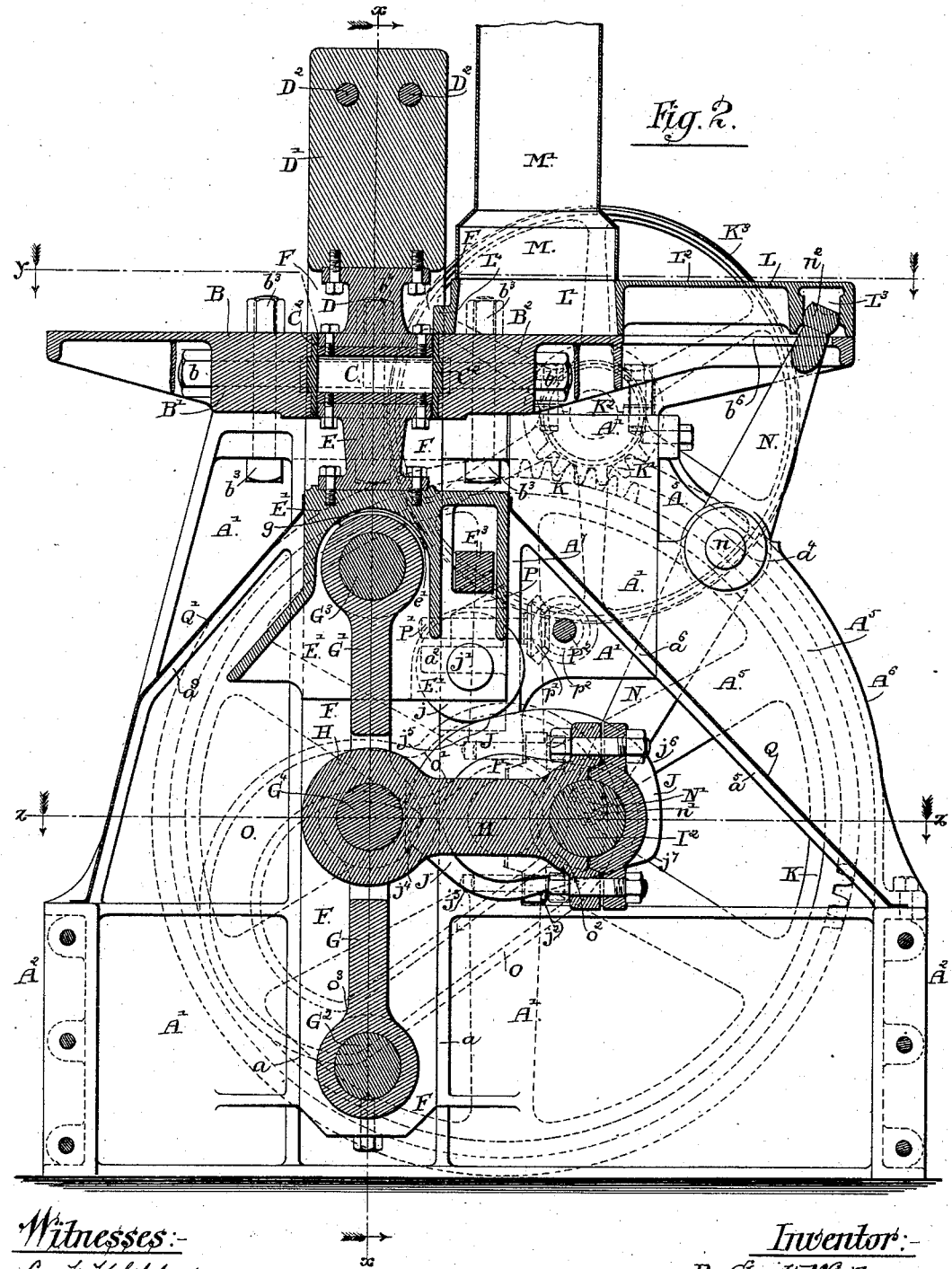
Figure 3:
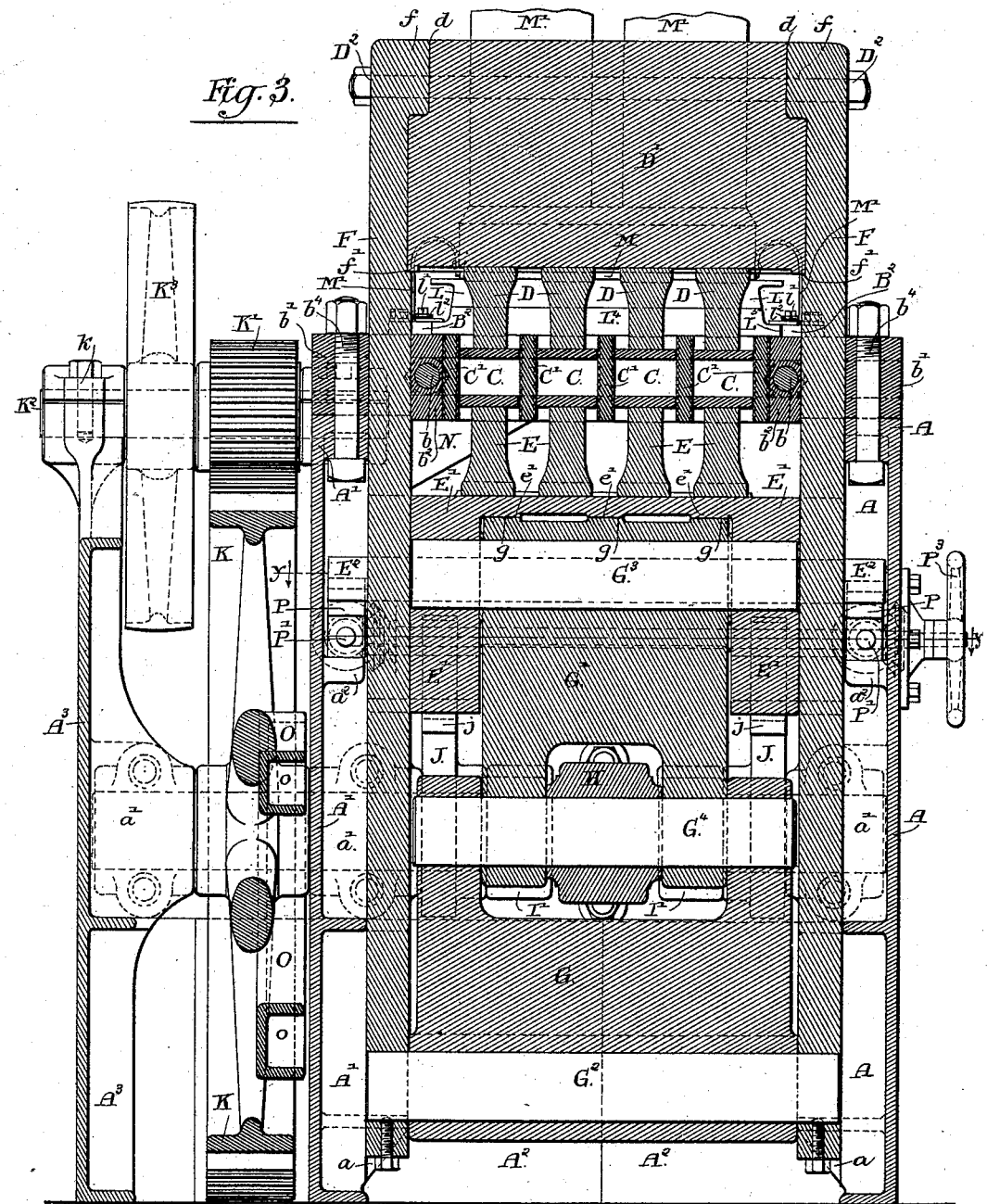
Figure 4:
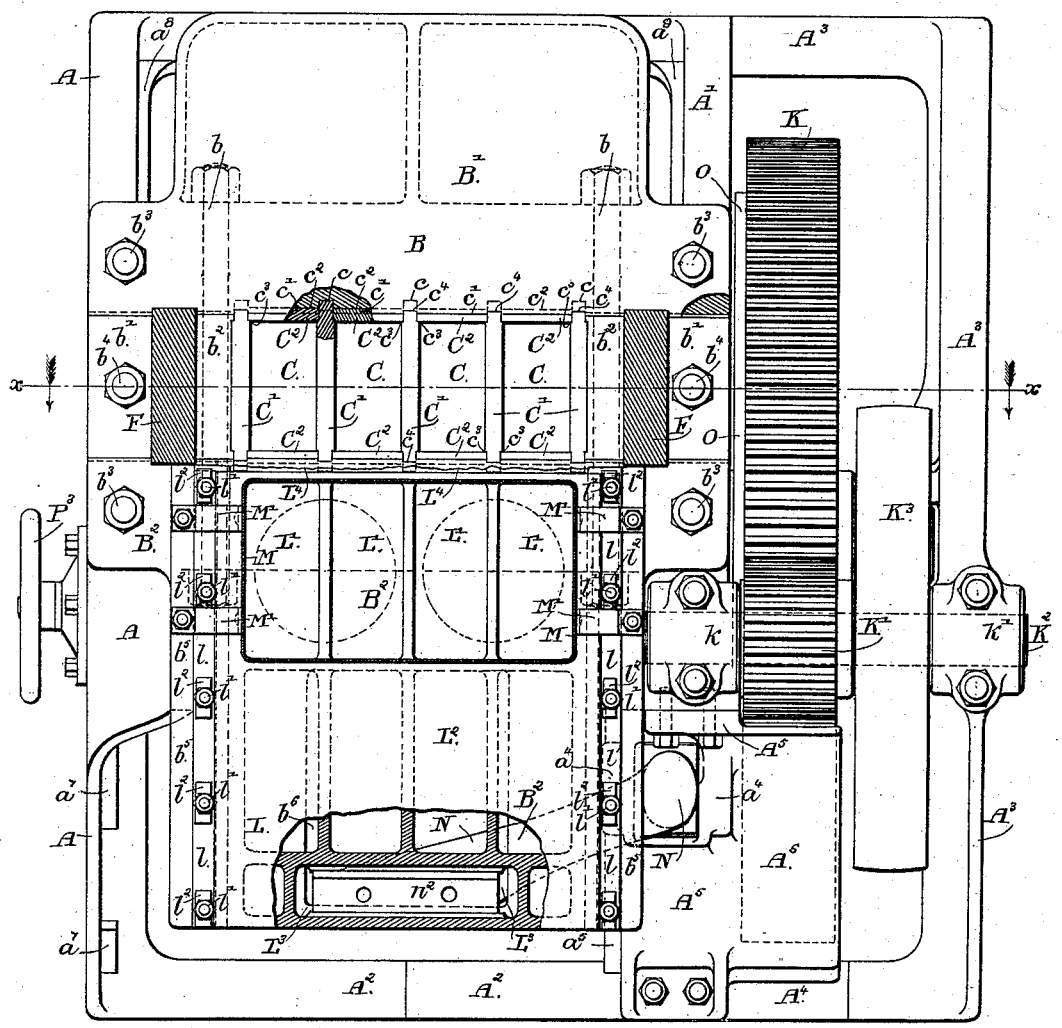
Figure 5:
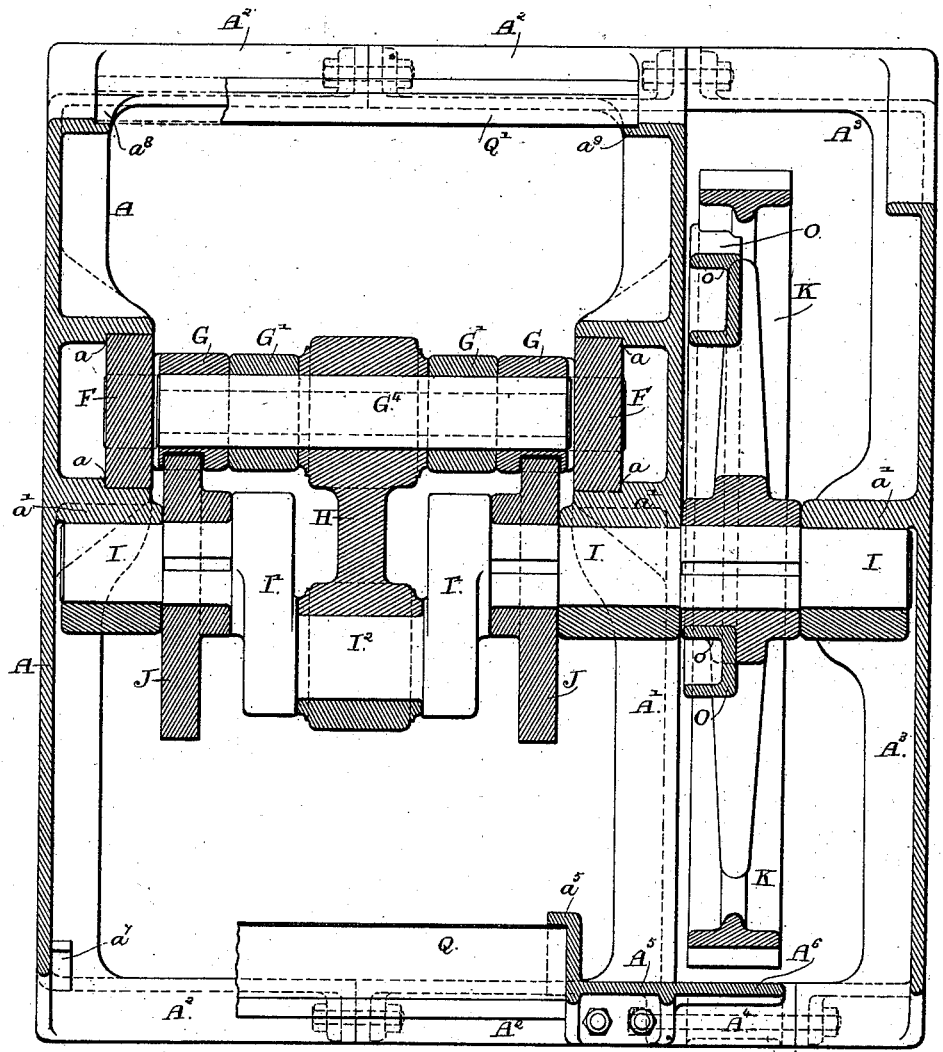
Figure 6:
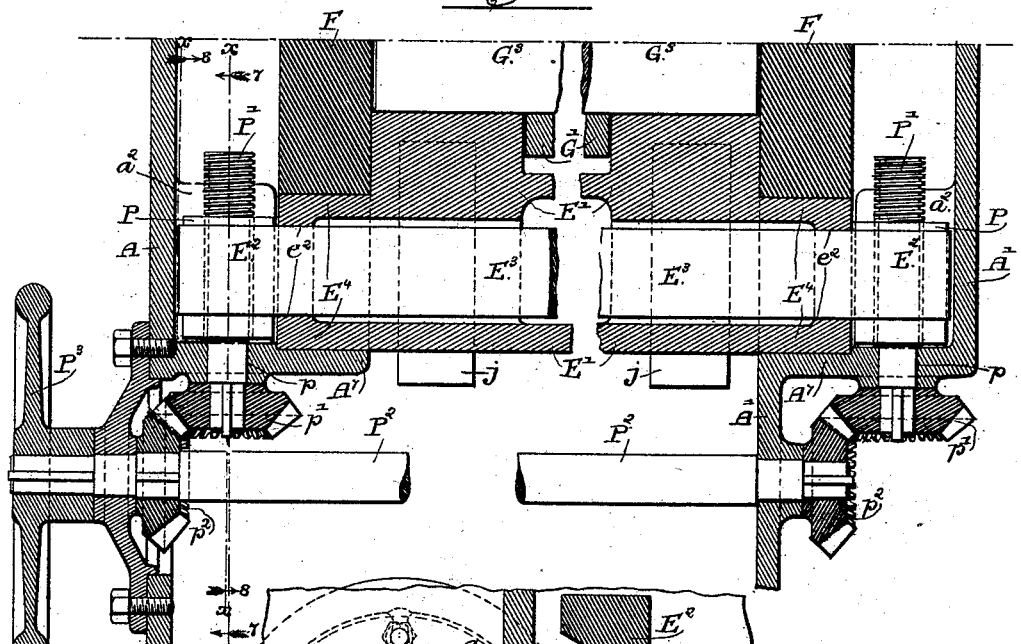
Figure 7:
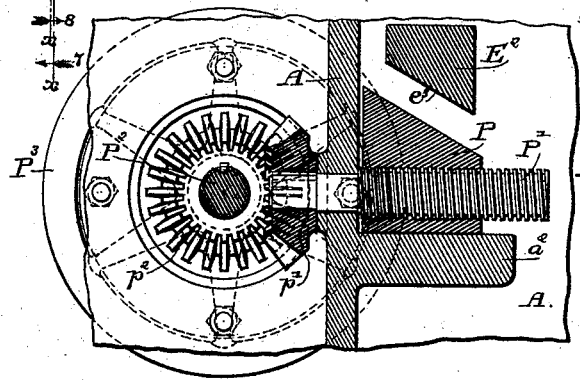
Figure 8:
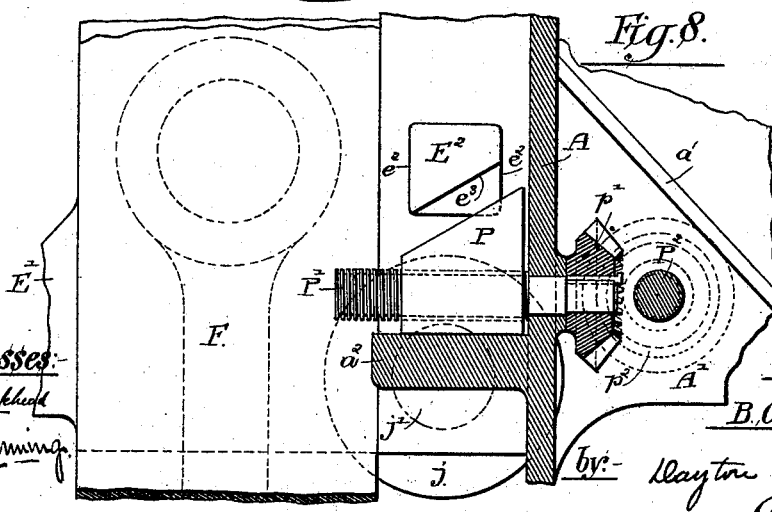

In the accompanying drawings, illustrating my invention, Figure 1 is an elevation of the machine as viewed from the rear or at the side into which the clay is inserted or fed, parts of the machine-frame being broken away to more clearly show the working parts. Fig. 2 is a central vertical section of the machine, taken upon line $x\,x$ of Fig. 1. Fig. 3 is a central vertical section of the machine, taken upon line $x\,x$ of Figs. 2 and 4. Fig. 4 is a sectional plan view of the machine, the section being taken upon line $y\,y$ of Fig. 2. Fig. 5 is a horizontal or plan section taken upon line $z\,z$ of Fig. 2. Fig. 6 is a detail horizontal section taken upon line $y\,y$ of Fig. 3. Fig. 7 is a detail section taken upon line $x\,x$ of Fig. 6, looking toward the exterior of the machine in the direction of the arrows marked 7 7. Fig. 8 is a sectional view taken upon the said line $x\,x$ of Fig. 6, looking toward the interior of the machine, or in the direction of the arrows marked 8 8. Fig. 9 is a detail section taken upon line $x'\,x'$ of Fig. 2, illustrating the rocking lever by which the feed-box is actuated. Fig. 10 is a detail section taken upon line $y'\,y'$ of Fig. 2, showing the protecting-plate Q and its connections with the frame.

The main frame of the machine herein illustrated as embodying my invention consists of two frame-plates A A', which are connected at their lower parts by means of heavy inwardly-extending parts or arms $A^2\,A^2$, cast integral with the plates A A' and bolted together at a point intermediate to the frame-plates, as clearly shown in the drawings.

$A^3$ is a third frame-plate arranged vertically outside of and parallel with the frame-plate A'. The said plate $A^3$ is for the purpose of affording bearings for certain of the shafts of the machine, as will hereinafter fully appear. For a purpose hereinafter stated the frame-plate $A^3$ is connected at the rear of the machine with the adjacent frame-plate A' by means of a filling-piece $A^4$, bolted at its ends to the said plates A' and $A^3$.

At the top of the frame is located a horizontal top plate or mold-table B, which is bolted to the upper ends of the frame-plates A A', and within which are located molds C C C C, of which the machine illustrated is provided with four. Said mold-table is herein shown as consisting of two separate castings B' $B^2$, located in front and rear of the molds, which latter are formed by means of partitions C' C' C' C', engaged at their ends with the adjacent vertical surfaces of the said castings B' $B^2$. Said castings are held against the partitions by means of horizontal bolts $b$ $b$, passing through the said castings near their ends, filling-pieces $b'\,b'\,b^2\,b^2$ being inserted between the ends of the castings exterior to the partitions C' C' in the manner shown. The said castings B' and $B^2$ are bolted to the tops of the frame-plates by means of vertical bolts $b^3\,b^3$, passing through the ends of the plates B' $B^2$, and by bolts $b^4\,b^4$, which pass through the external filling-pieces $b'\,b'$, which are interlocked with the said castings, in a manner hereinafter more fully set forth.

D D D D are a series of plungers constructed to enter and slide in the upper parts of the molds C C, said plungers being attached to a common cross-head D', located above the mold-table B of the machine.

E E E E are a series of lower plungers constructed to slide in the molds C, and attached to a single rigid cross-head E', located beneath the said mold-table.

F F are two heavy vertical bars, which are mounted in suitable guide grooves or ways $a$ $a$ upon the inner faces of the frame-plates A A'. Said bars extend from a point near the bottom of the machine through the mold-table B to points above the latter and are attached at their upper ends to the cross-head D'. Said bars are preferably made straight and of uniform size, excepting at their upper ends, where they are provided with inwardly-extending projections $f\,f$, entering notches or rabbets $d$ $d$ in the ends of the cross-head D', the said bars being attached to the cross-head by means of horizontal bolts $D^2\,D^2$, passing longitudinally through the cross-head and through the upper ends of said bars in the manner shown.

In order to prevent the weight of the cross-head D' and connected parts coming upon the bolts, the bars F are further provided with shoulders $f'\,f'$, engaging the lower corners of the cross-head. The devices shown for connecting the upper cross-head with the slide-bars F F have the advantage of enabling the upper cross-head D to be readily removed from the machine by taking out the bolts $D^2$ $D^2$ and then slipping the cross-head sidewise out of engagement with the slide-bars.

G G' are two toggle-arms, which are pivoted, respectively, to the lower ends of the slide-bars F F and to the lower cross-head E'. The lower part of the toggle-arm G is desirably made the full width of the space between the slide-bars F F, and said toggle-arm is pivotally connected with the said bars by a heavy pivot-pin $G^2$, fixed at its ends in the slide-bars and extending through a long bearing-aperture in the toggle-arm. The upper toggle-arm G' is constructed to enter a recess in the lower or under surface of the cross-head E', and is pivotally connected with the latter by means of a pivot-pin $G^3$, inserted through bearing-apertures in opposite ends of said cross-head and in the upper part of the said toggle-arm. The toggle-arms G G' are pivotally connected with each other by means of a heavy pin $G^4$, inserted through the overlapping forked ends of said toggle-arms, said pin being also adapted to engage a connecting-rod H, by means of which power is applied to the toggle-arms.

I is a heavy crank-shaft mounted in bearings $a'$ $a'$ $a'$ in the frame-plates A A' $A^3$, said crank-shaft being located adjacent to and approximately in the same horizontal plane with the pivot-pin $G^4$ and nearly beneath the lower cross-head E'. Said crank-shaft is provided with two crank-arms I' I', carrying a heavy crank-pin $I^2$, with which the connecting-rod H is engaged. The said crank-shaft I is so disposed with relation to the toggle-arms G and G' that in the rotation of said shaft said toggle-arms will be alternately straightened out and flexed by the action of the crank and connecting-rod. Said parts are so disposed, furthermore, that the toggle-arms will be straightened out or will be brought into alignment with each other at the time the crank-pin is at the extreme limit of its throw away from the toggle-arms, or, in other words, the crank is constructed to act in straightening the toggle by pulling or drawing upon the connecting-rod instead of by an end-thrust, giving a compressive strain upon the rod.

For the purpose of taking from the pivot-pin $G^3$ a part of the strain produced by the toggles the upper toggle-arm may be provided with convex cylindric bearing-surfaces $g\,g$ in contact with corresponding concave bearing-surfaces $e'\,e'$ upon the lower cross-head E'. Similar bearing-surfaces may be employed at the joint between the upper and lower toggle-arms, if found necessary or desirable. Upon the said crank-shaft I, at opposite sides of the crank, are rigidly secured two cams J J, which are constructed to act upon the lower cross-head E' in such manner as to raise and lower the latter as the shaft rotates.

As herein shown, anti-friction rollers $j\,j$ are mounted on bearing-pins $j'\,j'$, fixed in the said lower cross-head E' in position to act upon the surfaces of the cams.

K is a heavy drive-wheel affixed to the shaft I between the frame-plates A' $A^3$. Said drive-wheel is provided with peripheral cogs, which engage a pinion K', mounted upon a shaft $K^2$, mounted in bearings $k\,k'$ in the frame-plates A' $A^3$ at the upper part of the frame, said shaft having upon it a belt-pulley $K^3$, over which may be placed a driving-belt for transmitting power to the machine.

The shafts I and $K^2$ are provided with bearings in both of the frame-plates A' $A^3$, so that the said shafts are supported at both sides of the cog-wheels K and pinion K' thereon.

The purpose of the removable section $A^4$ of the frame is to enable the cog-wheel K to be removed from its place between the frame-plates A' and $A^3$ without disturbing the latter.

L is a sliding feed-box, which rests upon the top of the mold-table B at the rear side of the molds. Said feed-box consists of a horizontal plate or casting provided at its end adjacent to said molds with a series of rectangular openings L' L' L' L', corresponding in horizontal dimensions and in number with the molds C C C. The openings L' L' are closed at their bottoms by the mold-table, upon which the feed-box rests except when the feed-box is moved forward to bring the said openings over the molds.

The feed-box is provided at its sides with guide-flanges $L^4$ $L^4$, which are held in guides $L^5$ $L^5$ upon the mold-table, Figs. 1, 3, and 4, said guides being formed, as shown, by means of vertical ribs or projections $b^5\,b^5$ at the side margins of the casting $B^2$ and removable plates $l\,l$, held in place by means of tap-bolts $l'\,l'$, inserted through said plates into the ribs $b^5\,b^5$. The said plates are held yieldingly in place by means of spring-washers $l^2\,l^2$, placed between the heads of the bolts $l'\,l'$ and the plates $l\,l$, in order to allow the feed-box to yield upwardly and pass over any solid object that may become caught or jammed between the feed-box and its seat.

M is a stationary feed-hopper located over the sliding feed-box L at a point adjacent to the upper plungers D. Said hopper is, as shown, sustained by means of spring-arms M' M' from the mold-table, and is fitted closely at its lower edges to the horizontal top surface of the feed-box. Said feed-box L has a horizontal reciprocatory motion through a distance sufficient to carry the openings L' L' over the molds C C and under the feed-hopper M. When beneath the hopper M, the feed-box receives material from the hopper, which is supported on the top of the work-plate B, and discharges such material into the molds C C when the feed-box is moved to bring the said receptacle over said molds. At the rear of and adjacent to the said receptacles L' L' the feed-box is provided with a smooth horizontal top surface $L^2$, which extends the full width of the feed-box and is somewhat longer than the distance through which the latter travels in its reciprocatory motion. Said surface $L^2$ is for the purpose of supporting the material within the hopper at the time the said feed-box is being moved forwardly and backwardly to carry the clay to the molds, in the manner described.

For the purpose of giving reciprocatory motion to the feed-box a rocking lever N is provided, which is pivotally supported between its ends upon a pivot-pin $n$, sustained upon the machine-frame, and is engaged at its upper end with a bearing-recess $L^3$ at the rear end of the feed-box and provided at its lower end with a pin N', engaging the groove $o$ of a cam O, mounted on the crank-shaft I, said pin being desirably provided with an anti-friction roller $n'$. Said cam O is herein shown as supported from the crank-shaft by attachment to the arms of the drive-wheel K and as cast integral with the said wheel; but in practice said cam may be made separate from or attached to the wheel-spokes, either in whole or in part, or it may be sustained from the shaft independently of the said drive-wheel, as found convenient or desirable.

The recess $L^3$ of the feed-box, by which the upper end of the rocking lever is engaged therewith, is located in the under surface of said feed-box below the flat top surface $L^2$ thereof. This location of the recess $L^3$ brings the path of the upper end of the rocking lever within the space occupied by the part $B^2$ of the table by which the feed-box is supported, and said table is provided with a recess or opening $b^6$, giving space for the movement of the rocking lever. The recess $L^3$ is preferably extended nearly the full width of the feed-box, and the rocking lever is provided with a transversely-elongated head $n^2$, Figs. 2 and 4, giving a wide bearing-surface between the lever and the feed-box. The said recess $L^3$ is preferably made with flat vertical bearing-faces, and the head $n^2$ with curved side faces acting thereon.

The construction described, embracing the feed-box resting on the table and the rocking lever working through a slot in the table and engaging a recess in the under side of the feed-box, has the advantage that the rocking lever and joint connecting it with the feed-box are brought under the table and feed-box, so that said parts are concealed from view and protected from dust and dirt, while at the same time the feed-box can be easily disconnected from the rocking lever by lifting it out of engagement with the head $n^2$ of the same.

The operation of the main parts of the machine constructed as above described is as follows: The clay is fed to the hopper M through the tubes M' M', preferably in a slightly moist and pulverized state. The clay from within the said hopper fills the recesses L' L' of the reciprocating feed-box when the latter is at the rearward limit of its movement, and is carried forward by the said feed-box and deposited in the molds C C C C. At the time the feed-box moves forward to fill the molds the upper plunger is lifted to a point above the top surface of the feed-box, so as to allow the latter to pass beneath said plunger. After the clay has been deposited in the molds the feed-box is retracted by the action of the cam O, and the plungers D and E are then brought toward each other within the molds for suitably compressing the brick.

The compression of the brick is produced solely by the action of the toggle-arms operating through the medium of the slide-bars F F and the upper and lower cross-heads D' E'. The vertical position of the plungers within the molds at the time of compressing the brick is, however, determined by the action of the cams J J upon the lower cross-head E', the weight of the cross-heads, toggles, and connected parts being sustained by the said cams during this operation. I have so constructed the said cams in the particular machine shown that the lower plunger, which is directly moved thereby, will be raised about the same distance from the bottom of the molds that the upper plunger is carried into the mold, so that both plungers have an equal extent of movement within the mold, and the brick is finally compressed at a point at or near the middle of the latter. After the brick has been compressed the plungers D and E are separated by reverse movement of the toggle-arms, while the lower plunger is lifted by the action of the cams, so as to force the finished brick upwardly out of the mold. The compressed brick are thrust from their position upon the tops of the lower plungers by the action of the forward edge or end surface of the feed-box as it advances to again fill the molds, such advance movement of the feed-box being for this purpose timed to take place before the lower plungers descend.

I have herein shown the feed-box as provided at its front edge with a filling-piece or block L⁴, having a flat vertical face adapted to coincide with the rear margin of the molds at the time the feed-box is at the rearward limit of its movement. Said filling-piece L⁴ serves to start the finished brick forward at the moment the feed-box begins to move and operates to thrust or slide the finished brick forward upon the mold-table B to a point considerably in advance of the plungers.

The presence of the filling-piece having its vertical face coincident with the rear walls of the mold is of advantage, also, for the reason that when the face of the filling-piece is thus located no space is left at the rear of the molds to catch particles of clay, which, if present at that point, would be carried forward and pressed against and into the pressed bricks in the advance of the feed-box. When the filling-piece is arranged as above set forth, furthermore, the upper plungers in descending slide along the front face of the said filling-piece, so as to remove any clay that may have adhered thereto, and thus leave the surface thereof perfectly clean for its contact with the brick in the next forward movement of the feed-box.

For the purpose of subjecting the brick to suitable compression it is obviously immaterial as to the particular point in the molds at which the brick are compressed, or, in other words, the lower plunger may remain stationary at the bottom of the mold or elsewhere therein, and the upper plunger alone may be moved, or vice versa. I have found, however, that a product having a much more uniform and superior surface at its side edges and ends is produced when the clay is moved bodily in the mold in the process of compression, and to insure a uniform texture or surface in the side edges and ends of the brick I have so constructed the parts that first one and then the other of the plungers is moved within the mold, and the clay at the edges of the brick is thereby forced or carried along the side walls of the mold, which act with a smoothing or slicking action thereon. As a means of producing the relative movements of the parts in the manner stated, I so locate the actuating-cams J J with relation to the crank which operates the toggle-arms that the lower plunger will first rise throughout practically the full length of its stroke, so as to carry the clay in the lower part of the mold toward the top of the latter, and the upper plunger then descends toward the lower plunger, so as to thrust the clay in the top of the mold toward the lower plunger. It follows from this mode of operation of the parts that the clay which is to form the side edges and ends of the brick is first moved bodily upward along the side walls of the mold, thus giving a smoothing or slicking action thereon in one direction, and that the said clay is then moved downward along the said side walls with the same effect, all of the clay in the mold being moved in each instance, excepting that part in immediate contact with the plunger, which is stationary at the time.

To render more obvious the advantage gained by the movement of the plungers in the manner described, I may here explain that in case of brick made by compressive action of two opposing plungers moving toward the center line of the mold at the same time and at the same speed the upper and lower marginal parts of the end and side surfaces of the brick will present a smooth and polished appearance, while the surface of the said side edges and ends along the middle line thereof will present a roughened or granulated appearance. This result is probably due to the fact that the clay at the upper and lower parts of the brick will in the operation described be thrust or moved along in contact with the side walls of the mold as the plungers approach each other, while the clay at the middle part of the brick will merely remain in contact with the side walls of the mold without being moved thereon. By so actuating the upper and lower plungers, however, that first one and then the other is moved in the mold, the entire surface of the clay at the side edges and ends of the brick is subjected to the same slicking action that the upper and lower smooth surfaces of the brick are subjected to in a machine in which the plungers approach each other at the same time and at the same speed, and it follows that by construction of the machine such as is herein shown and above described, in which first one and then the other of the plungers is moved, the entire side and end surfaces of the brick will be rendered perfectly smooth and uniform.

The particular construction in the cams J J by which the movements of the lower plunger in the manner above described are produced will now be more particularly set forth. The said cam is provided with a curved surface $j^2$ to $j^3$, Fig. 2, approximately concentric with the shaft, along or over which the roller $j$ travels during the time that the lower cross-head is at the lowermost limit of its movement and when the toggle-arms are flexed to their greatest extent. Adjacent to this surface the cam is provided with an outwardly-inclined part $j^3 j^4$, operating to lift the lower plunger to the point which it occupies at the time the brick is subjected to the greatest compression. During this upward movement of the lower plunger the upper plunger is being drawn slowly downward by the action of the toggles; but said upper plunger remains in the upper part of the mold, owing to the fact that the toggles and other parts are moved bodily upward with the lower cross-head at about the same speed that the upper cross-head is drawn downwardly by the action of the toggles. After the lower cross-head has been lifted by the action of the inclined cam-face $j^3 j^4$ the roller rests upon a concentric surface $j^4 j^5$, extending through about onefourth of a circle, and operating to sustain the lower cross-head immovable while the upper cross-head is being drawn downward by the action of the toggles and the brick are being compressed. When the cam has been turned to bring the roller to the end of said surface $j^4 j^5$, the crank-pin has reached a point farthest away from a vertical line passing through the upper and lower pivots of the toggles, and the latter are at their maximum degree of extension. This is the position of the parts shown in Fig. 2, in which the connecting-rod H is shown as horizontal and the crank at the extreme limit of its throw toward the right.

The further rotation of the crank-shaft from the position described relaxes the toggle-arms, so as to separate the upper and lower plungers. Such further movement of the shaft, however, carries the roller $j$ upon an outwardly-deflected surface $j^5 j^6$ of the cam, whereby the lower cross-head and plungers are lifted for the purpose of thrusting the brick upwardly out of the mold. The said outwardly-deflected or eccentric surface $j^5 j^6$ is so disposed with relation to the crank-pin that the upper plungers will reach a point above the level of the top of the feed-box L at about the time the lower plunger reaches the level of the top of the table B, so that the said table may promptly advance to thrust the finished brick from the top of the lower plungers and upon the adjacent surface of the table. After the lower plungers have been raised to bring their upper surfaces flush with the top of the table the roller $j$ rests in contact with concentric surfaces $j^6 j^7$ of the cams, whereby the said lower plungers are sustained in the position referred to during the forward movement of the feed-box, by which the bricks are thrust forward upon the table, in the manner hereinbefore described. The end of the concentric cam-surface $j^6 j^7$ is connected with the inner concentric surface $j^2 j^3$ by an abrupt face $j^7 j^2$, allowing the lower cross-head to drop very rapidly to permit the prompt discharge of the clay from the feed-box into the mold, such clay obviously being supported by the lower plungers until the feed-box has reached the extreme forward limit of its movement.

The crank-shaft I, carrying the cams J J in the machine illustrated, is not located directly under the lower cross-head, but at one side of a vertical line passing through the center of the said cross-head. This arrangement of the parts obviously causes the cams in lifting the lower cross-head to act with an oblique pressure thereon, or, in other words, to thrust the said cross-head horizontally against its bearings in the frame, as well as vertically upward. In order to avoid the frictional resistance which would otherwise be present by reason of the lateral pressure of the ends of the lower cross-head against the frame, I provide the said cross-head at its ends with vertically-arranged guide projections $E^4 E^4$, Fig. 6, which are constructed to bear at their side faces against the side edges of the slide-bars F F and against opposing vertical guide-surfaces $A^7 A^7$ of the frames, Figs. 1, 2, and 6. Said projections $E^4 E^4$ are located at the side of the slide-bars nearest the crank-shaft, so that the lateral thrust upon the cross-head given by the cams is taken by the said slide-bars. The said lower cross-head is lifted by the cams for compressing the brick at the time that the toggles are nearly vertical or in alignment with each other, the said toggles, slide-bars, and the upper cross-head being moved bodily upward by the action of said cams in the manner above stated, so that the slide-bars and lower cross-head are moved relatively to each other to a very slight extent during the lifting of the lower cross-head. It follows that the lateral pressure of the lower cross-head during the upward movement is taken by the slide-bars, which are moving upwardly with it, and inasmuch as the said slide-bars have bearings upon the frame extending throughout the full height of the frame-plate, such lateral pressure is distributed over very long bearing-surfaces, with a correspondingly slight increase of frictional resistance to the movements of the parts. I consider this feature of construction, whereby the said lower cross-head has lateral bearings against the slide-bars, to embody an important feature of novelty, for the reason that if the said lower cross-head were provided with short bearings at its ends against the frame the lateral thrust produced by the cams would not only produce great friction on the bearings, but would tend to turn or twist the cross-head in its bearings, so as to wear the bearings irregularly and soon produce serious injury to the machine.

The cam O, by which the rocking lever N is actuated, comprises a concentric part $o' o^2$, through which the pin N' travels during the time that the compressing-plungers are approaching each other and until the upper plungers have been raised above the level of the top of the feed-box, with a straight part extending from $o^2$ to $o^3$ operating to throw the said pin N' at first slowly and then more rapidly outward toward the periphery of the wheel, whereby the feed-box is advanced slowly at first to overcome the inertia of the parts and to give time for the upper plungers to rise from the molds, and then more rapidly after the upper plungers are out of the way, and with a part $o^3$ to $o^2$ operating to promptly retract the feed-box after the lower plunger has reached the bottom of the mold.

The quantity of clay deposited in the mold for the purpose of making the brick is obviously determined by the position of the lower plunger within the molds at the time the clay is deposited therein from the feed-box, it being entirely obvious that any surplus clay which will not enter the molds from the feed-box will be scraped off and carried rearwardly by the feed-box at the time the latter is retracted. It is desirable, therefore, to provide means for varying the position of the lower plungers when the latter are at the lower limit of their movement, in order to enable more or less clay to be fed to the molds, or for accurately determining the quantity of different kinds of clays used, or of clay which is more or less moist, so as to produce a brick of the exact density desired.

For the purpose above stated I have provided an adjustable stop for limiting the downward movement of the lower cross-head E', such stop operating, when the cross-head is actuated by a cam or cams, as shown, to sustain the said cross-head free of the cam or cams when the parts of the latter nearest the center of the crank-shaft are in position to engage the cross-head. As herein shown, the said adjustable stops consist of two inclined blocks or wedges P P, provided with devices whereby they may be moved horizontally, so that projecting parts or arms $E^2$ $E^2$ of or upon the cross-heads will strike said wedges at high or low points, as determined by the horizontal position of the wedges. In the particular construction of the said wedges P P and means for adjusting the same herein illustrated said parts are made as follows: Said wedges P P are located inside of the frame-plates A A' and rest upon horizontal flanges $a^2$ $a^2$, cast upon the inner surface of said frame-plates. The wedges are arranged to move horizontally in a direction parallel with the plates, and for the purpose of moving them short screw-shafts P' P' are provided, said screw-shafts having screw-threaded engagement with the wedges and being provided with bearings $p$ $p$ in the frame-plates. The shafts are held from endwise movement in the said bearings by suitable collars or shoulders thereon, as shown. For the purpose of actuating the said screw-shafts P' P' a transverse shaft $P^2$ is mounted in the machine-frame adjacent to the wedges, and said shaft $P^2$ and the screw-shafts P' P' are provided with intermeshing beveled gears $p'$ $p'$ $p^2$ $p^2$. The said shaft $P^2$ is provided at one of its ends outside of the machine-frame with a hand-wheel $P^3$, by which the shaft may be turned for simultaneously moving the wedges P P. The shaft and gear-wheel connection with the wedges P obviously enables said wedges to be moved together to an equal extent, and thereby facilitates the rapid and accurate adjustment of the lower plungers, for the purpose above stated. The projections $E^2$ $E^2$ upon the lower cross-head for engaging the wedges are herein shown as formed by means of a straight wrought-iron bar $E^3$, made somewhat longer than the cross-head and inserted through openings $e^2$ $e^2$ in the ends of the cross-head, with its ends projecting in position to engage the said wedges, in the manner clearly shown in Figs. 2 and 6. In order that the ends of the bar $E^3$ may have sufficient bearing-surfaces to engage the beveled or inclined upper surfaces of the wedges P, the ends of the bar $E^3$ are desirably beveled to correspond with the inclination of the wedges, as indicated at $e^3$, Figs. 7 and 8.

The particular construction illustrated in the means whereby the molds are formed between the two separate parts or castings B' $B^2$ composing the mold-table B is as follows: The several partitions C' C' C', by which the several molds are divided from each other in the manner hereinbefore described, are held in position with relation to the said castings B' $B^2$, which form the end walls of the mold, by means of tenons $c$ $c$ upon opposite ends of the said partitions, which tenons enter mortises formed in the said castings B' $B^2$ midway of the vertical thickness of the latter. The end walls of the molds are formed by lining-plates $C^2$ $C^2$, which rest against the inner vertical faces of the castings B' $B^2$, and are provided with horizontal ribs or tongues $c'$ $c'$, entering shallow horizontal grooves $c^2$, formed in the said vertical faces of the castings. The said lining-plates $C^2$ are held in position against the castings by means of shoulders $c^3$ $c^3$, formed upon the sides of the partitions C' C' and engaging the ends of the said lining-plates, in the manner clearly shown in the drawing, Fig. 4. For the purpose of securely holding the partition-plates C' C' in place, shallow vertical grooves $c^4$ $c^4$ are formed in the surfaces of the castings B' $B^2$ above and below the mortises $c$ $c$ to receive the ends of the partitions at either side of the mortises. The horizontal grooves $c^2$ $c^2$ of the said castings B' and $B^2$ are desirably extended throughout the entire length of the castings B' $B^2$ from side to side of the machine, and the filling-pieces $b'$ $b'$ $b^2$ $b^2$, above described, are provided with tongues entering said grooves, so that said filling-pieces, as well as the lining-pieces, are interlocked with the said castings.

The construction described in means for forming the molds C C and lining therefor has great advantages in point of simplicity and cheapness of construction, for the reason that the several partitions, filling-pieces, and lining-plates are of simple rectangular form, and may be easily made and finished, while the grooves or recesses in the castings B' and $B^2$ are so disposed that they may be finished by planing in a familiar manner, the horizontal grooves $c^2$ being formed by a single cut extending throughout the entire length of the castings, while the grooves $c^4$ are formed by simple cross-cuts with the planing-tool, which may be made to accurately correspond in the two castings B' and $B^2$ by placing said castings together and planing out the cross-slots in both castings at the same time. The mortises $c$ must of course be separately planed or finished; but the outline thereof will be exactly determined by the horizontal and cross grooves $c^2$ $c^4$, so that said mortises may be accurately formed without trouble. By the construction described in the means forming the molds, furthermore, the castings B' and $B^2$, together with all of the filling-pieces, partition-plates, and filling-plates, are held together by the two bolts *b b*, extending through said castings, in the manner before described.

The machine-frame illustrated embraces certain features of novelty which are herein claimed as part of my invention, and which are as follows:

A⁵ is a frame-casting, which is bolted at its upper end to the rear upper part of the frame-plate A' and at its lower end to the flange of the base part A² of said plate. Said casting A⁵ is provided with bearings $a^4$ $a^4$ for the pivot-pin *n* of the rocking lever N, and is provided also with an outwardly-extending cylindric part A⁶, which extends over the adjacent part of the drive-wheel K, so as to inclose and protect the latter from dust and dirt. At its inner side the casting A⁵ is provided with an inclined rib $a^5$, forming a continuation of a similar rib $a^6$, cast upon the upper part of the frame-plate A'. At the opposite side of the machine the frame-plate A is provided with a correspondingly-inclined rib $a^7$. Said ribs $a^5$, $a^6$, and $a^7$ are for the purpose of sustaining a metal plate Q, which extends from the upper surface of the frame-base A² upwardly and inwardly to a point adjacent to the lower cross-head E', against the vertical face of which said plate is constructed to rest. At the opposite side of the machine the frame-plates A and A' are provided with inclined flanges $a^8$ $a^9$, Fig. 5, extending inwardly and constructed to support a plate Q', which also rests or bears at its upper edge against the lower cross-head E'. The said frame-plates A and A' are made imperforate or without openings, and the plates Q and Q' serve to entirely inclose the space between said frame-plates within which the principal operative parts of the machine are located, thereby entirely protecting such parts from dust or dirt which might otherwise find access thereto. The close sliding joints formed between the upper margin of said plates Q and Q' and the vertical side faces of the cross-head E' obviously serve to prevent the inward passage of dust or clay at this point.

The employment of cams or other devices acting directly upon the lower cross-head for moving the latter vertically in a machine embracing toggles which are connected and move vertically with the upper and lower plungers is of advantage in several particulars. A construction of this kind is much more simple than one in which the lower plunger is moved by means applied to the toggles or some other part of the plunger-actuating devices, and the cams or other devices may be more easily constructed to give the motion desired in the lower cross-head for the reason that, inasmuch as any intermediate movable parts between the said lower cross-head and the said actuating devices are absent, the movement of such connecting parts does not influence the motion given by the said cams or actuating devices to the said cross-head.

Another important advantage gained by the employment of means acting directly upon the lower cross-head to move the latter vertically is, that the upper cross-head and other parts are in this construction lifted by the toggles themselves, so that the joints or bearings of the toggles are subjected to tension as well as to compressive strain. It has been found difficult to keep properly oiled the joints of toggles subjected to heavy pressure, for the reason that the pressure of the pivot-pins of the toggles upon the bearing-surface of the toggle-arms is commonly so great as to squeeze all of the oil out from between the bearing-surfaces. If the pressure upon the joints of the toggles is always in one direction, the said bearing-surfaces are constantly held forcibly in contact with each other, and no opportunity is allowed for the inflow of oil between the said surfaces. In case, however, the joints of the toggles are placed alternately under tension and compression, as occurs when the upper cross-head and connected parts are lifted by power applied to the lower cross-head, as in the machine shown, the bearing-surfaces which undergo the heavy pressure in compression of the bricks are entirely relieved from pressure between each act of compression, so as to allow the inflow of the lubricator between them, thus enabling the joints to be properly lubricated at all times.

I claim as my invention—

1. The combination, with the machine-frame, a stationary mold sustained thereon, and upper and lower compressing-plungers sliding therein, of slide-bars connected with the upper plunger and movable vertically upon the frame, toggle-arms pivoted to said slide-bars and to the lower plunger and sustaining said slide-bars and upper plunger from the lower plunger, means connected with the middle joint of the toggle-arms for actuating the same, and a lifting device applied to the lower plunger for moving the same vertically, together with the toggle-arms, slide-bars, and upper plunger, substantially as described.

2. The combination, with a machine-frame, a stationary mold, and upper and lower compressing-plungers, of slide-bars mounted upon the frame and connected with the upper plunger, toggles pivoted to the lower plunger and to the slide-bars and sustaining said slide-bars from the lower plunger, a horizontal shaft provided with a crank, a connecting-rod joining the crank with the middle joint of said toggles, and a cam mounted upon the shaft and acting upon under surface of the lower plunger to raise and lower the plungers, slide-bars, and connected parts, substantially as described.

3. The combination, with a machine-frame, a series of stationary molds located at the upper part of the frame, upper and lower compressing-plungers, upper and lower cross-heads supporting said plungers, vertical slide-bars mounted in the machine-frame and attached at their upper ends to the upper cross-head, toggle-arms pivoted to the lower cross-head and to the said slide-bars and supporting the said slide-bars from said lower cross-head, a horizontal shaft located beneath and parallel with the lower cross-head, said shaft being provided with a crank, a connecting-rod joining the said crank with the middle joint of the toggles, and cams mounted upon said shaft and acting upon the lower cross-head to raise and lower the said cross-head and connected parts, substantially as described.

4. The combination, with stationary molds, upper and lower plungers, and upper and lower cross-heads supporting said plungers, of vertically-movable slide-bars attached at their upper ends to the upper cross-head, toggle-arms pivoted to the lower ends of the slide-bars and to the lower cross-head and sustaining said bars from the said lower cross-head, a drive-shaft provided with a crank for actuating the toggles, a connecting-rod uniting said crank with middle joint of the toggle-arms, and cams mounted upon the shaft and acting upon the lower cross-head, said cams being provided with outwardly-inclined surfaces for lifting the lower cross-head and connected parts, located in such position with relation to the crank-pin that in compressing the brick the lower cross-head will be elevated by the action of the cams before the upper cross-head is depressed by the action of the toggle-arms, substantially as described.

5. The combination, with a machine-frame, a stationary mold, and two opposing vertically-moving plungers sliding in the mold, of toggles or equivalent compressing devices connected with both of said plungers, said toggles and connected parts being mounted to slide freely in a vertical direction upon the frame, cams or equivalent lifting devices separate from the said compressing devices, acting upon the lower plunger and the compressing devices connected therewith for moving the latter vertically, and an adjustable stop sustaining the lower plunger and connected parts when the latter are unsupported by the lifting devices, whereby the quantity of clay placed in the mold to form the brick may be varied as desired, substantially as described.

6. The combination, with stationary molds, upper and lower plungers working therein, an upper cross-head sustaining the upper plungers, vertically-movable slide-bars attached at their upper ends to the said upper cross-head, a lower cross-head sustaining the lower plungers mounted to slide vertically in the machine-frame, toggle-arms pivoted to the lower ends of said slide-bars and to the lower cross-head and supporting said slide-bars from the said lower cross-head, a crank-shaft provided with a crank for actuating the toggles, a connecting-rod uniting the said crank with the middle joint of the toggles, cams upon the said shaft acting upon the lower cross-head to move the latter and connected parts vertically, and adjustable stops upon the machine-frame sustaining the lower cross-head when the latter is unsupported by the cams, substantially as described.

7. The combination, with the machine-frame and a stationary mold supported upon the frame, of upper and lower plungers working in said mold, cross-heads supporting said plungers, long slide-bars rigidly attached at their upper ends to the ends of the upper cross-head and sustaining and guiding the same, said slide-bars extending past and below the lower cross-head, and the frame being provided with guides for the lower parts of the slide-bars, said guides being located entirely below the top of the mold-table, and compressing devices connected with the lower ends of said slide-bars and with the lower cross-head, acting to force the plungers together, said compressing devices being located beneath the mold-table, all substantially as described.

8. The combination, with the machine-frame and stationary molds, of upper and lower plungers, upper and lower cross-heads, slide-bars attached to the upper cross-head, toggles connecting the lower ends of the slide-bars with the lower cross-head, a shaft provided with a crank, a connecting-rod uniting the crank with the toggles, and cams on the said shaft acting upon the lower cross-head, said lower cross-head being constructed to bear at its ends against the side edges of said slide-bars, substantially as described.

9. The combination, with the machine-frame comprising imperforate frame-plates A and A', a mold-table secured to the top of said plates, and actuating devices located beneath the mold-table, of removable covers Q and Q', fitted between the said frame-plates, substantially as described.

10. The combination, with frame-plates A A', provided upon their inner faces with inclined ribs, of covering-plates Q and Q', resting upon said ribs, substantially as described.

11. The combination, with the machine-frame comprising imperforate frame-plates A A', a mold-table secured to the top of said plates, upper and lower cross-heads, and mechanism located beneath the table for actuating said cross-heads, said lower cross-head being provided with flat vertical side faces, of covering-plates Q Q', supported at their side edges upon the frame-plates and bearing at their upper margins against the lower cross-head, substantially as described.

In testimony that I claim the foregoing as my invention I affix my signature in presence of two witnesses.

B. CLARK WHITE.

Witnesses:
C. CLARENCE POOLE,
O. N. WILLIS.